United States Patent [19]
Obrecht

[11] Patent Number: 5,899,110
[45] Date of Patent: May 4, 1999

[54] PIVOTING FABRICATING APPARATUS WITH A LINEAR ACTION

[75] Inventor: Robert Obrecht, Bloomfield Hills, Mich.

[73] Assignee: REO Hydraulic Pierce & Form, Inc., Detroit, Mich.

[21] Appl. No.: 08/980,628

[22] Filed: Dec. 1, 1997

[51] Int. Cl.$^6$ ........................................ B21J 9/18
[52] U.S. Cl. ........................................ 72/453.15; 72/450
[58] Field of Search .................... 72/453.15, 453.16, 72/453.17, 456, 409.08, 409.01, 450; 83/628

[56] References Cited

U.S. PATENT DOCUMENTS

| | | | |
|---|---|---|---|
| 3,584,493 | 6/1971 | Crees | 72/321 |
| 4,033,388 | 7/1977 | Ruegger | 140/106 |
| 4,099,433 | 7/1978 | Muto | 83/155 |
| 4,433,569 | 2/1984 | Santinelli | 72/410 |
| 4,519,267 | 5/1985 | Takahasi | 74/473 R |
| 4,998,351 | 3/1991 | Hartmeister | 30/228 |
| 5,022,253 | 6/1991 | Parlatore | 72/325 |
| 5,291,644 | 3/1994 | Musil | 29/243.53 |
| 5,636,814 | 6/1997 | Rollert | 244/129.5 |

*Primary Examiner*—Joseph J. Hail, III
*Assistant Examiner*—William Hong
*Attorney, Agent, or Firm*—Young & Basile, P.C.

[57] ABSTRACT

A fabricating apparatus especially designed to perform work operations in areas where access is limited. The apparatus includes a frame defining an anvil and a straight guide bore, a first fabricating tool mounted on the anvil proximate the guide bore, a power cylinder mounted on the frame, and a link defining first and second ends and pivotally mounted at the first end thereof on the frame. A piston assembly is mounted in the power cylinder and includes a piston rod having a free end pressing against the link at a location between the first and second ends of the link. A carrier is mounted for linear movement on the frame and includes a main body portion and a guide rod portion slidably received in the frame guide bore. A second fabricating tool is mounted on a first face of the carrier in confronting relation to the first fabricating tool and a roller is mounted on the second end of the link and rollably engages a second face of the carrier opposite from the first carrier face. A spring is positioned in the guide bore and urges the carrier away from the first fabricating tool to urge the second carrier face against the roller and urge the link against the free end of the piston rod.

11 Claims, 3 Drawing Sheets

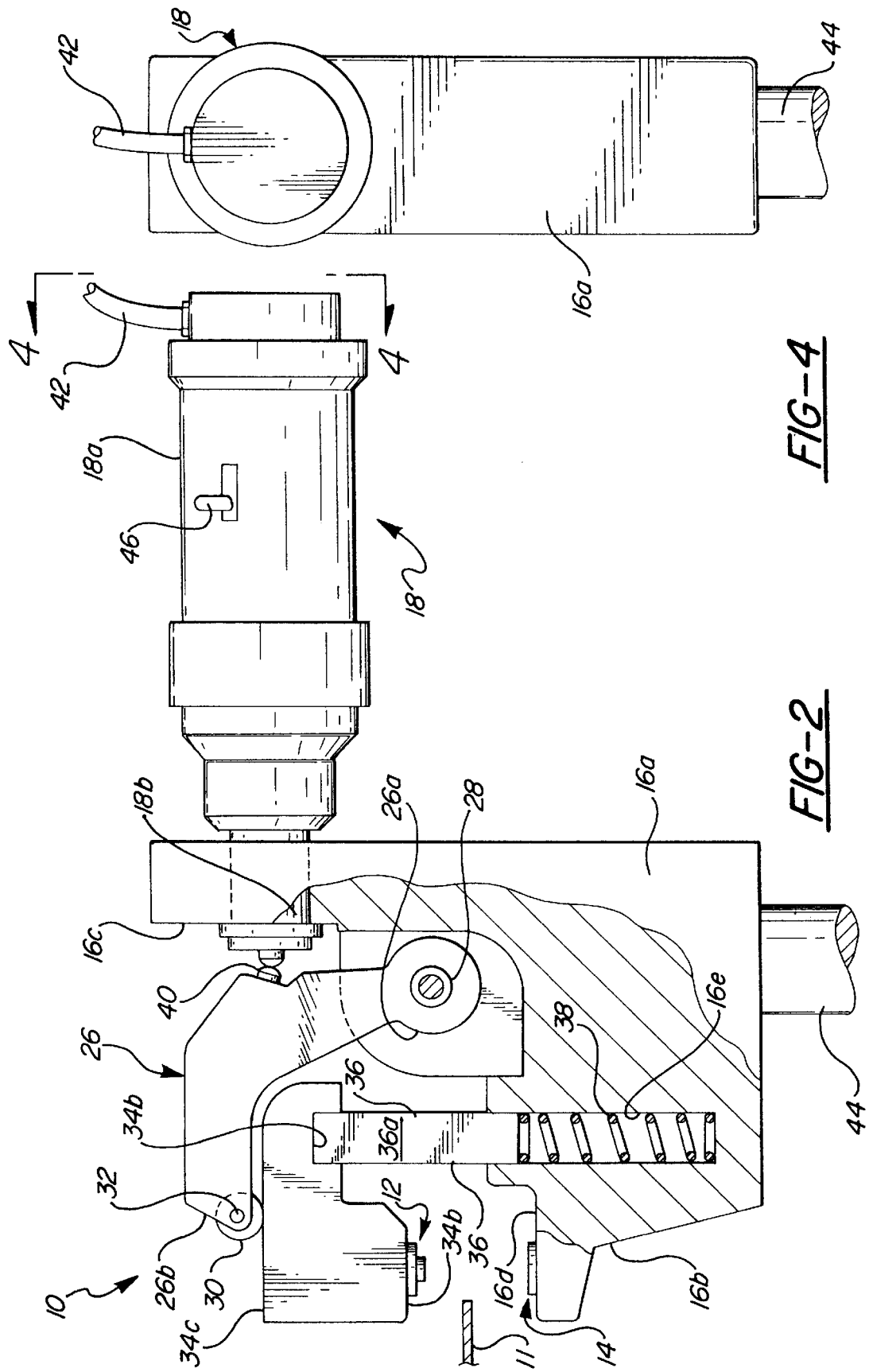

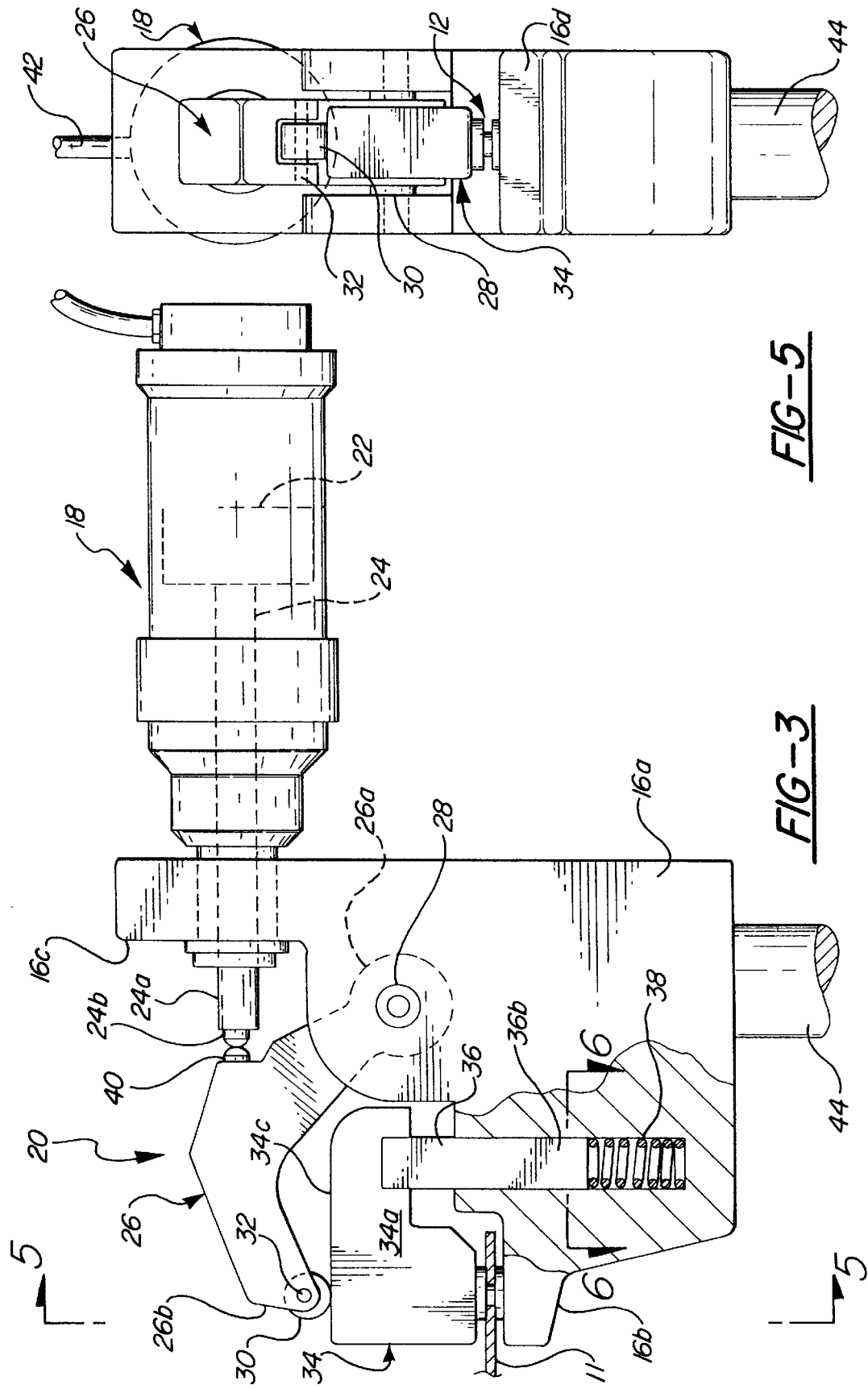

PIVOTING FABRICATING APPARATUS WITH A LINEAR ACTION

BACKGROUND OF THE INVENTION

This invention relates to fabricating apparatus and more particularly to a fabricating apparatus employing a pivoting operation.

Fabricating apparatuses are commonly used in our industrial society for a myriad of mechanical fabricating operations, such as piercing, punching, shape forming, resistance welding or the like. Fabricating apparatus typically include first and second fabricating tools which coact to perform a work operation on a workpiece. Wherever possible, the first and second tools are arranged to move together in a simple linear fashion to provide a positive linear coaction of the tools. However, in many industrial situations, space constraints make it impossible to approach the workpiece from both sides in a linear fashion and, instead, some manner of pivoting or scissors device is employed to access the workpiece. Scissors devices have the inherent disadvantage that they bring the first and second fabricating tools together to perform the work operation with a wiping action which in some scenarios results in an inferior work operation on the workpiece.

SUMMARY OF THE INVENTION

This invention is directed to the provision of an improved fabricating apparatus.

More specifically, this invention is directed to the provision of a fabricating apparatus which provides a straight linear fabricating action even when performing work operations in tight confines.

The apparatus of the invention is intended to perform a work operation on a workpiece and is of the type including a frame defining an anvil, a first fabricating tool mounted on the anvil, a second fabricating tool, a power cylinder mounted on the frame, and ram means operative in response to the introduction of pressurized fluid into the power cylinder to move the second fabricating tool into coacting fabricating relation with the first fabricating tool.

According to the invention, the ram means includes a piston assembly slidably mounted in the power cylinder and including a piston rod, a link pivotally mounted on the frame and including a free end, and a carrier mounted for linear movement on the frame; the second fabricating tool is mounted on a first face of the carrier in confronting relation to the first fabricating tool; the free end of the link pushingly engages a second face of the carrier opposite from the first carrier face; and the piston rod drivingly engages the link at a location thereon such that extension of the piston rod pivots the link about its pivot axis and presses the link free end against the second face of the carrier to move the carrier and thereby the second fabricating tool linearly on the frame toward the first fabricating tool while the link free end moves laterally on the second face of the carrier. This specific arrangement allows a pivoting scissors type action to be used to provide access to tight confines, but yet results in a final linear movement of the second fabricating tool into positive engagement with the first fabricating tool.

According to a further feature of the invention, the ram means further includes a roller mounted on the link free end and rollably engaging the carrier second face and the roller moves rollably on the carrier second face in response to extension of the piston rod. This arrangement allows a smooth rolling interaction as between the pivoting and linearly moving elements of the tool.

According to a further feature of the invention, the carrier is spring biased for linear movement on the frame in a direction away from the first fabricating tool. This arrangement pre-loads the apparatus and specifically presses the second carrier face against the roller and presses the link against the free end of the piston rod.

According to a further feature of the invention, the carrier includes a main body portion carrying the second fabricating tool and a straight guide rod portion received in a linear bore in the frame, and the spring biasing of the carrier is provided by a spring positioned in the bore and pressing against the guide rod portion. This arrangement effectively combines the guiding and pre-loading functions in a single structure.

According to a further feature of the invention, the link defines first and second ends; the link is pivotally mounted at the first end thereof on the frame; the roller is mounted on the second end of the link; and the free end of the piston rod engages the link a location between the first and second ends.

In the disclosed embodiment of the invention, the carrier is mounted for linear movement on the frame in a direction generally at right angles to the direction of movement of the piston assembly and the apparatus further includes a handle extending from the frame in a direction generally parallel to the direction of movement of the carrier.

BRIEF DESCRIPTION OF THE DRAWINGS

FIG. 2 is a side elevational view of the fabricating apparatus with the fabricating tools shown in a rest or separated condition;

FIG. 3 is a side elevational view similar to FIG. 2 but showing the fabricating tools in a coacting or working position;

FIG. 4 is an end view looking in the direction of the arrow 4 in FIG. 2;

FIG. 5 is an end view looking in the direction of the arrow 5 in FIG. 3; and

DETAILED DESCRIPTION OF THE PREFERRED EMBODIMENT

Figure 1:
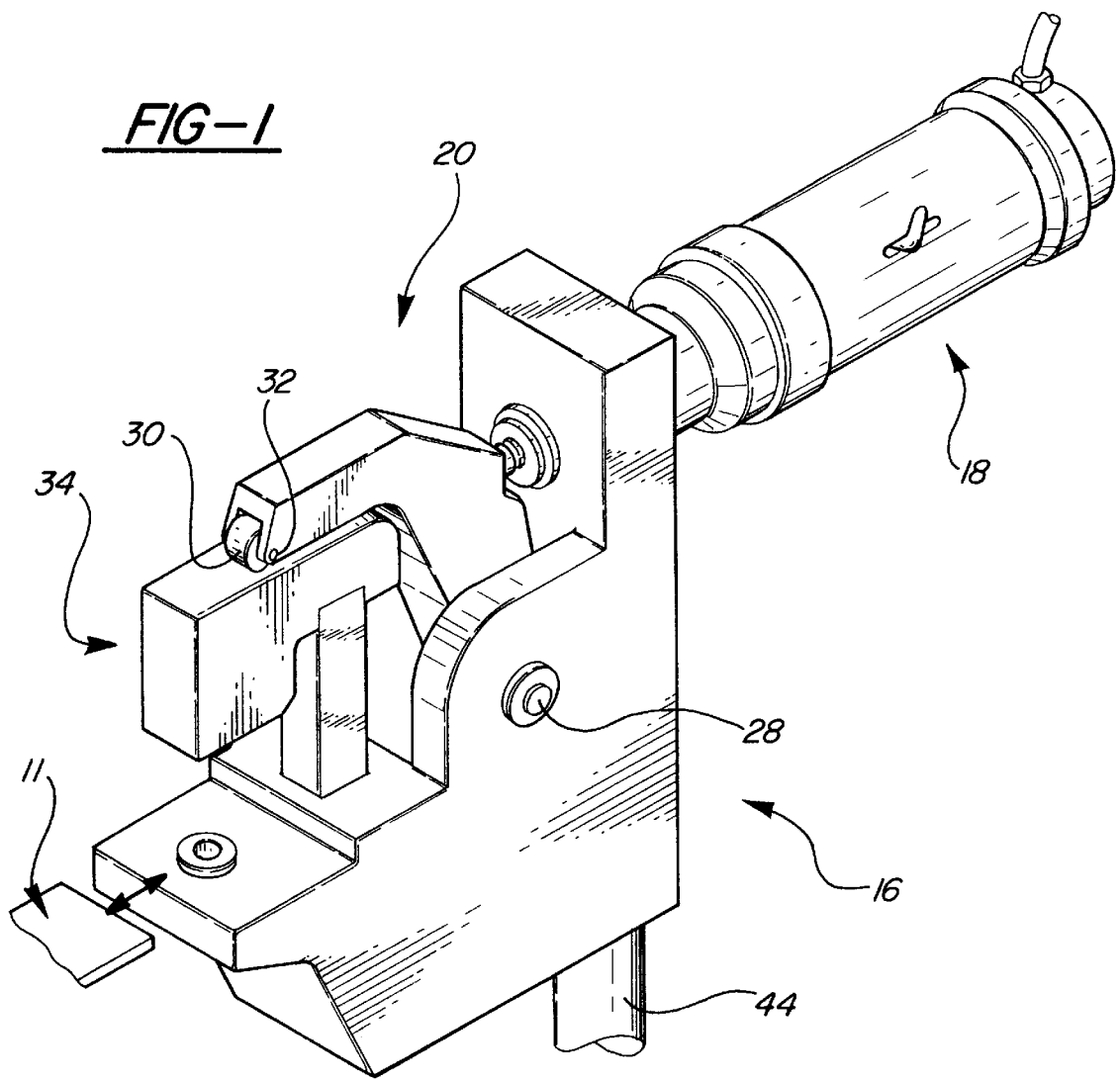
FIG. 1 is a perspective view of a fabricating apparatus according to the invention.

The fabricating apparatus 10 of the invention is intended to perform a work operation on a workpiece such as the workpiece 11. For example, the fabricating apparatus may include a first fabricating tool 12 in the form of a punch and a second fabricating tool 14 in the form of a die with the punch and die coacting in known manner to pierce a hole in the workpiece upon movement of the fabricating tools together.

The fabricating apparatus 10, broadly considered, includes a frame 16, a pressure cylinder 18, and a ram assembly 20.

Frame 16 has a plate configuration and includes a main body portion 16a, an anvil portion 16b, and an upper flange portion 16c. Die 14 is positioned on the upper face 16d of anvil portion 16b.

Pressure cylinder 18 is of known form and may comprise a pneumatic or hydraulic fluid pressure device. Cylinder 18 includes a main body portion 18a and a reduced diameter forward portion 18b received in a suitable aperture in the flange portion 16c of the frame and suitably rigidly secured the frame.

Ram assembly 20 includes a piston 22 sealingly and slidably received in cylinder 18, a piston rod 24 connected to piston rod 24 and extending forwardly from the piston and through reduced diameter cylinder portion 18b and frame flange portion 16c to define a free forward end 24a of the piston rod; a link 26 of bell crank configuration pivotally mounted at a first lower end 26a on main body portion 16a of the frame by a pin 28 and defining a second, upper, free end 26b; a roller 30 journaled on the free end 26b of the link via a pin 32; and a carrier 34.

Carrier 34 includes a main body portion 34a and a guide portion in the form of a guide rod 36. Punch 12 is mounted on the lower face 34b of the carrier main body portion.

The upper end 36a of guide rod 36 is fixedly secured in a pocket 34b in carrier main body portion 34a and the lower end 36b of the guide rod is slidably received in a vertical guide bore 16e defined in the main portion body of the frame proximate die 14. A coil spring 38 positioned in bore 16e below the lower end 36b of the guide rod urges the guide rod upwardly to thereby urge the upper face 34c of the carrier into engagement with roller 30 and pivot link 26 about pin 28 to press a button 40 positioned on the link between the ends 26a and 26b of the link into engagement with a button portion 24b defined on the free end 24a of the piston rod.

Figure 6:
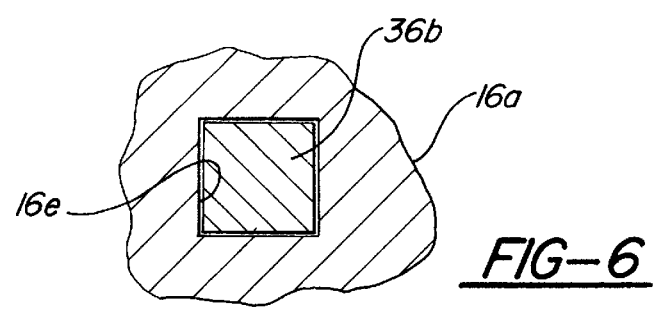
FIG. 6 is a cross-sectional view taken on line 6—6 of FIG. 3.

As best seen in FIG. 6, guide rod 36 and guide bore 16e have a matching rectangular cross-sectional configuration to preclude turning of the carrier as the guide rod and carrier move linearly up and down relative to the frame to move punch 12 toward and away from die 14. It will be seen that spring 38 functions to maintain loading in the apparatus as between the carrier, the link, and the piston rod with the apparatus in the rest or separated position seen in FIG. 2.

Upon actuation of pressure cylinder 18, as for example by the introduction of pneumatic pressure or pressurized hydraulic fluid into the cylinder 18 via a pressure line 42, piston 22 moves forwardly within the cylinder to advance or extend piston rod 24. The advancing piston rod, as best seen in FIG. 3, acts through buttons 24b/40 to drivingly engage link 26 and pivot the link about pin 28. This has the effect of pressing roller 30 downwardly against the carrier and pushing the carrier linearly downwardly to move punch 12 into linear coacting engagement with die 14. As the link pivots and the carrier moves downwardly, roller 30 moves rollably and laterally along the upper face 34c of the carrier to minimize friction and provide a positive downward movement of the carrier in response to the pivotal movement of the link. As the carrier move downwardly, guide rod 36 coacts with guide bore 16e to ensure that the downward movement is linear and to ensure that the coaction of punch 12 and die 14 is linear and devoid of any wiping action.

As guide rod 36 moves downwardly in bore 16e, spring 38 is compressed and loaded so that, upon completion of the punching operation on workpiece 11 and relaxation of the pressure in cylinder 18, the spring may press upwardly on guide rod 36 to move the carrier, link, and piston rod to the rest position seen in FIG. 2, ready for another punching operation in response to reintroduction of pressurized fluid into cylinder 18.

The invention apparatus 10 may be used as a part of a fully automated system or, as shown, may include a handle 44 projecting downwardly from frame 16 in a direction generally parallel to the direction of movement of carrier 34, and at right angles with respect to the direction of movement of piston assembly 22/24, so as to enable the apparatus to be used as a hand held tool to conveniently access workpieces located in tight confines. When used as a hand held tool, a suitable control valve 46 may be provided on cylinder 18 to manually control the admission and discharge of pressurized fluid from cylinder 18 via pressure line 42.

The fabricating apparatus of the invention will be seen to employ a scissors-type movement so as to allow access to extremely tight confines but to deliver the final coacting movement of the fabricating tools in a completely linear manner so as to optimize the work operation performed on the workpiece by eliminating wiping movement between the fabricating tools during the performance of the work operation.

Although a preferred embodiment of the invention has been illustrated and described in detail, it will be apparent that various changes may be made in the disclosed embodiment without departing from the scope or spirit of the invention. For example, although the frame has been illustrated and described as comprising a single piece member, in actual practice, and as a concession to manufacturing feasibility, the frame would more likely be produced in several sections which would thereafter be suitably secured together as by bolting.

I claim:

1. An apparatus for performing a work operation on a workpiece including a frame defining an anvil, a first fabricating tool mounted on the anvil, a second fabricating tool, a power cylinder, and ram means operative in response to the introduction of pressurized fluid into the power cylinder to move the second fabricating tool into coacting, fabricating relation with the first fabricating tool, characterized in that:

the ram means includes a piston assembly slidably mounted in the power cylinder and including a piston rod, a link pivotally mounted on the frame and including a free end, and a carrier mounted for linear movement on the frame;

the second fabricating tool is mounted on a first face of the carrier in confronting relation to the first fabricating tool;

the free end of the link pushingly engages a second face of the carrier opposite from the first carrier face; and the piston rod drivingly engages the link at a location thereon such that extension of the piston rod pivots the link about its pivot axis and presses the link free end against the second face of the carrier to move the carrier and thereby the second fabricating tool linearly on the frame toward the first fabricating tool while the link free end moves laterally on the second face of the carrier.

2. An apparatus according to claim 1 wherein:

the ram means further includes a roller mounted on the link free end and rollably engaging the carrier second face; and the roller moves rollably on the carrier second face in response to extension of the piston rod.

3. An apparatus according to claim 2 wherein:

the carrier is spring biased for linear movement on the frame in a direction away from the first fabricating tool, whereby to press the second carrier face against the roller.

4. An apparatus according to claim 3 wherein:

the carrier includes a main body portion carrying the second fabricating tool and a straight guide rod portion received in a linear bore in the frame; and the spring biasing of the carrier is provided by a spring positioned in the bore and pressing against the guide rod portion.

5. An apparatus according to claim 2 wherein:

the link defines first and second ends;

the link is pivotally mounted at the first end thereof on the frame;

the roller is mounted on the second end of the link; and the piston rod engages the link at a location between the first and second ends.

6. An apparatus for performing a work operation on a workpiece comprising:

a frame defining an anvil;

a first fabricating tool mounted on the anvil;

a power cylinder mounted on the frame;

a link pivotingly mounted on the frame;

a piston assembly slidably mounted in the power cylinder and including a piston rod having a free end pushingly engaging the link;

a carrier mounted for linear movement on the frame;

a second fabricating tool mounted on a first face of the carrier in confronting relation to the first fabricating tool; and a roller mounted on the link and rollably engaging a second face of the carrier opposite from the first carrier face;

the introduction of pressurized fluid into the power cylinder acting to extend the piston rod to pivot the link about its pivot axis and press the roller against the second face of the carrier to move the carrier and thereby the second fabricating tool linearly on the frame toward the first fabricating tool while the roller moves rollably on the second face of the carrier.

7. An apparatus according to claim 6 wherein:

the carrier is spring biased for linear movement on the frame in a direction away from the first fabricating tool, whereby to press the second carrier face against the roller and press the link against the free end of the piston rod.

8. An apparatus according to claim 7 wherein:

the carrier includes a main body portion carrying the second fabricating tool and a straight guide rod portion received in a linear bore in the frame; and the spring biasing of the carrier is provided by a spring positioned in the bore and pressing against the guide rod portion.

9. An apparatus according to claim 6 wherein:

the link defines first and second ends;

the link is pivotally mounted at the first end thereof on the frame;

the roller is mounted on the second end of the link; and the free end of the piston rod engages the link at a location between the first and second ends.

10. An apparatus for performing a work operation on a workpiece including a frame defining an anvil, a first fabricating tool mounted on the anvil, a second fabricating tool, a power cylinder, and ram means operative in response to the introduction of pressurized fluid into the power cylinder to move the second fabricating tool into coacting, fabricating relation with the first fabricating tool, characterized in that:

the ram means includes a piston assembly slidably mounted in the power cylinder and including a piston rod having a free end, a link pivotally mounted on the frame, a roller mounted on the link, and a carrier mounted for linear movement on the frame;

the second fabricating tool is mounted on a first face of the carrier in confronting relation to the first fabricating tool;

the roller rollably engages a second face of the carrier opposite from the first carrier face; and the free end of the piston rod pushingly engages the link at a location thereon such that extension of the piston rod pivots the link about its pivot axis and presses the roller against the second face of the carrier to move the carrier and thereby the second fabricating tool linearly on the frame toward the first fabricating tool while the roller moves rollably on the second face of the carrier.

11. An apparatus for performing a work operation on a workpiece comprising:

a frame defining an anvil and a straight guide bore;

a first fabricating tool mounted on the anvil proximate the guide bore;

a power cylinder mounted on the frame;

a link defining first and second ends and pivotally mounted at the first end thereof on the frame;

a piston assembly slidably mounted in the power cylinder and including a piston rod having a free end pressing against the link at a location between the first and second ends of the link;

a carrier mounted for linear movement on the frame and including a main body portion and a guide rod portion slidably received in the frame guide bore;

a second fabricating tool mounted on a first face of the carrier in confronting relation to the first fabricating tool;

a roller mounted on the second end of the link and rollably engaging a second face of the carrier opposite from the first carrier face; and a spring positioned in the guide bore and urging the carrier away from the first fabricating tool to urge the second carrier face against the roller and urge the link against the free end of the piston rod.

* * * * *